United States Patent [19]

Schriefer

[11] Patent Number: 5,651,721

[45] Date of Patent: Jul. 29, 1997

[54] METHOD FOR THE PRECISION WORKING OF GEARS WITH AN INTERNALLY TOOTHED TOOL, WHICH FOR DRESSING REMAINS IN THE PRECISION WORKING MACHINE

[75] Inventor: Herbert Schriefer, Gauting, Germany

[73] Assignee: The Gleason Works, Rochester, N.Y.

[21] Appl. No.: 299,558

[22] Filed: Sep. 1, 1994

[30] Foreign Application Priority Data

Sep. 1, 1993 [DE] Germany ............... 43 29 360.3

[51] Int. Cl.$^6$ .................................... B24B 49/00
[52] U.S. Cl. ........................... 451/11; 451/21; 451/47
[58] Field of Search ........................ 451/47, 5, 8, 10, 451/11, 21, 22, 114

[56] References Cited

U.S. PATENT DOCUMENTS

| | | | |
|---|---|---|---|
| 3,765,129 | 10/1973 | Anthony et al. | 451/10 |
| 4,559,744 | 12/1985 | Wirz | 451/11 |
| 4,757,644 | 7/1988 | Erhardt et al. | 451/11 |
| 4,833,836 | 5/1989 | Tang | 451/5 |
| 4,955,163 | 9/1990 | Sommer | 451/21 |
| 4,991,353 | 2/1991 | Weiner | 451/11 |
| 5,076,020 | 12/1991 | Negri | 451/21 |
| 5,129,185 | 7/1992 | Erhardt | 451/11 |
| 5,136,522 | 8/1992 | Loehrke | 451/21 |
| 5,377,457 | 1/1995 | Loos et al. | 451/47 |
| 5,413,520 | 5/1995 | Fiesel | 451/1 |
| 5,443,338 | 8/1995 | Huber et al. | 409/7 |

FOREIGN PATENT DOCUMENTS

| | | |
|---|---|---|
| 31 50 961 | 9/1982 | Germany . |
| 8910726 | 2/1991 | Germany . |
| G93 00 936.4 | 7/1993 | Germany . |
| 2018178 | 10/1979 | United Kingdom . |

OTHER PUBLICATIONS

Schriefer, Herbert, "Zahnflanken–Feinbearbeitung für die Grossserienfertigung", *Werkstatt und Betrieb*, vol. 126, (1993)No. 7, pp. 411–415.

*Primary Examiner*—James G. Smith
*Assistant Examiner*—Dona C. Edwards
*Attorney, Agent, or Firm*—Robert L. McDowell; Ralph E. Harper

[57] ABSTRACT

A method for the precision working of the tooth flanks of gear-shaped workpieces with an abrasive internally toothed tool wherein the tool, after each workpiece or after several workpieces, is dressed in the same mounting with a dressing wheel, the tooth system of which corresponds with the one of the gear-shaped workpiece and the tooth flanks of which are covered with extremely hard grinding granules. To improve the tool geometry the dressing of the internally toothed tool is done with a one-flank or a two-flank contact between the dressing wheel and the internally toothed tool and with an electronic forced guiding of the rolling and relative movements between the dressing wheel and the internally toothed tool, and, the precision working in the free or in the torque guided two-flank engagement between the internally toothed tool and the workpiece.

1 Claim, 1 Drawing Sheet

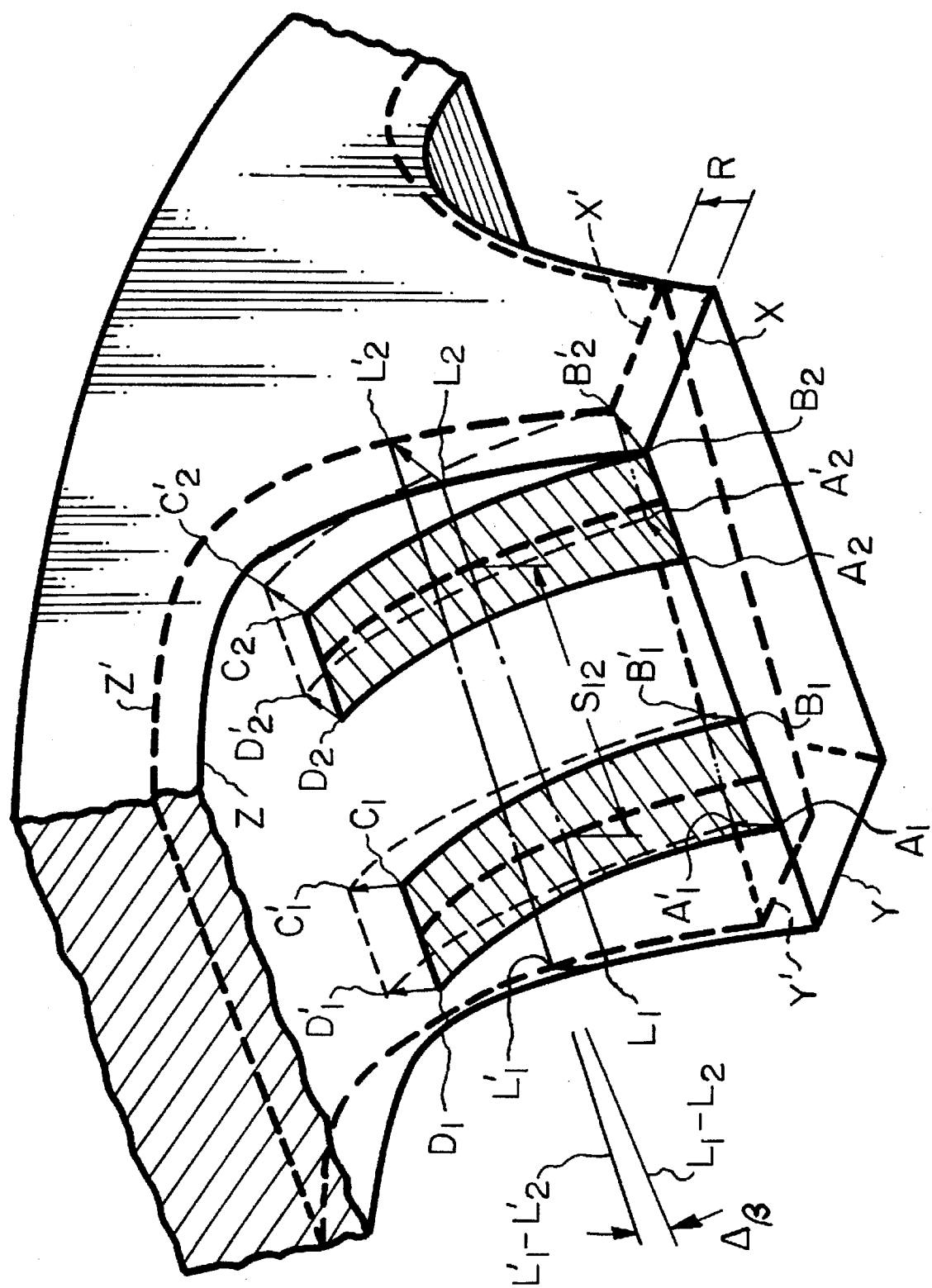

METHOD FOR THE PRECISION WORKING OF GEARS WITH AN INTERNALLY TOOTHED TOOL, WHICH FOR DRESSING REMAINS IN THE PRECISION WORKING MACHINE

FIELD OF THE INVENTION

The present invention is directed to a method of machining gears and the like with an internally toothed tool and dressing of the tool. More particularly, the present invention discloses a method of dressing an internally toothed tool wherein the pitch angle of the tool is controlled.

BACKGROUND OF THE INVENTION

The invention is based on the kinematics of a machine drive for the tool and work gear axes of rotation, the principle of which can be carried out on a machine which is discussed in U.S. Pat. No. 5,443,338 to Huber et al.

Practice has shown that when dressing the internally toothed tool with a dressing wheel coated with a hard material, which dressing wheel has a smaller contact zone than the width of the tool, problems arise when bringing about a desired change of the tool pitch angle with this contact zone during a freely running engagement. A change of the pitch angle in dependency of the dressing state and of the therewith changing profile shift between tool and work gear or dressing wheel is desirous, as it is described in U.S. Pat. No. 5,377,457 to Loos et al, in order to maintain the contact force balance during the freely running engagement.

When the contact zone between the dressing wheel and tool is shifted in the tooth flank width direction, then additional rotations occur. This means that the path of the contact zone differs from the path predetermined by the existing tool pitch angle. The dressing wheel is furthermore desirous of following the existing tool pitch angle during the freely running engagement. Thus, a calculated change of the existing tool pitch angle is not possible.

On the other hand, a freely running engagement between the work gear and the internally toothed tool has often advantages, since only as much material is to be removed from the work gear flanks as it is needed for a satisfactory operation of the work gear. Shorter machining times and longer tool lives result.

SUMMARY OF THE INVENTION

The basic purpose of the invention is therefore to provide a method of the type being discussed here in such a manner that during a tool dressing, a continuously changing defined tool pitch angle can be produced with a dressing wheel and, during the machining, only the least required material amount is removed from the work gear flanks, which assures the operability of this structural part.

The purpose is attained with a dressing method in which an additional rotation is suspended upon the rotative part of a forcedly or torque guided rolling movement and wherein the additional rotation is accompanied by relative movement between the dressing wheel and the tool along three orthogonal axes.

The forcedly guided dressing results in a further advantage, namely, that the tool receives a very exact pitch geometry. This pitch geometry is transferred during the machining of the work gears within the contact surfaces of the coated work gear and tool area. A suitable pitch geometry of the work gear is created in this manner and has a significant influence on the operability. On the other hand, it is accepted during the freely running or machining of the work gear that pitch sum deviations cannot be influenced or can be influenced only to a limited degree. These deviations, however, have only little influence on the operability, however, represent large amounts of material during machining, which amounts can often lie beyond the actual flank allowance.

To determine the pitch-angle dependent additional rotation, the exact knowledge of the position of the instantaneous contact zone between the dressing wheel flanks and the tool flanks is needed. A mathematic model determines here how the positions of the axes must be for the specified relative contact positions between the tool flanks and the dressing wheel flanks. Corresponding with the continuously changing axial position of the contact zones on the tool flanks, the basic rotation resulting from the ratio of the number of teeth between the dressing wheel and the tool is superposed by an additional rotation.

The forcedly guided dressing is possible with a one-flank or a two-flank contact. A longer dressing time does result, however, from the one-flank contact, but the corrections of the right and left flanks of the tool can thereby be influenced separately from one another. The exact tool tooth width which, because of the hard material coating of the dressing wheel, is complicated to produce through a two-flank contact, can be kinematically realized through a relative rotation between the dressing wheel and the tool.

BRIEF DESCRIPTION OF THE DRAWING

The single FIGURE shows a tooth Z of an internally toothed tool prior to the dressing and Z' after the dressing.

DETAILED DESCRIPTION

The operation of the dressing with an electronic forced guiding will be discussed hereinafter with the aid of the FIGURE and the freely running engagement during machining. The tool head radius is thereby increased by R from Z to Z'. The flank line is prior to the dressing ($L_1$–$L_2$) and after the dressing ($L_1$–$L_2$)'. Between these two flank lines there results in accordance with the principles of the tooth-system geometry a predeterminable pitch angle change, $\Delta B$, of the tool.

The contact zone (A, B, C, D)$_1$ moves prior to the dressing to (A, B, C, D)$_2$ through a movement $S_{12}$ on the tool flank. This is the state during machining in the freely running engagement between tool and work gear flanks. It is possible through a two-flank engagement and the covering of the contact zones over several work gear teeth to produce the specified work gear pitch angle also with contact zones which are smaller than the width of the work gear. The area of engagement of the tool teeth is represented conjugatively as an area of engagement of the work gear teeth.

During dressing with a simultaneous pitch angle change the contact zones shift from (A, B, C, D)$_1$ to (A, B, C, D)$_{1'}$ and from (A, B, C, D)$_2$ to (A, B, C, D)$_{2'}$. It is conceivable that, through a relative movement of a contact zone in the tool width direction, uncontrollable additional rotations are created which, just like during machining, prevent the creation of a specified changed flank line ($L_1$–$L_2$)'. Thus, a guiding of the contact zones from (A, B, C, D)$_1$ to (A, B, C, D)$_{1'}$ and from (A, B, C, D)$_2$ to (A, B, C, D)$_{2'}$ is therefore only possible through a forced guiding between the tool and the dressing wheel. The shift of the contact zones from (A, B, C, D)$_1$ to (A, B, C, D)$_{1'}$ and from (A, B, C, D)$_2$ to (A, B, C, D)$_{2'}$ can thereby be accomplished through a relative movement along three axes, which are orthogonally related to one another, along the flank line to be newly produced or through a combination of the relative movement along the axes and a relative rotation. The contact zones (A, B, C, D) $_{1,2,1',2'}$ correspond to four instantaneous contact stages. A continuous enveloping through several dressing strokes in the tool width direction is needed during the actual dressing.

The strokes are chosen such that portions of the contact zones go beyond the tool width. An extreme imbalance of the contact forces turning to the right and to the left are created in these contact stages and can only be controlled through a forcedly guided dressing.

The embodiments of the invention in which an exclusive property or privilege is claimed are defined as follows:

1. In a method for the precision working of tooth flanks of gear-shaped workpieces in a freely guided two-flank engagement with an abrasive internally toothed tool having a width and a tooth system comprising a plurality of tooth flanks which, after said precision working of one or more workpieces, in the same mounting is dressed with a dressing wheel having a tooth system corresponding with that of said gear-shaped workpieces, said dressing wheel tooth system comprising tooth flanks being covered with extremely hard grinding granules, said dressing comprising rotation of said tool and dressing wheel in engagement with one another and including relative movement between said tool and dressing wheel such that said dressing wheel is moved across the tooth flanks of said tool, said dressing of the internally toothed tool occurring with a one-flank or a two-flank contact between the dressing wheel and the internally toothed tool, the improvement being:

electronic forced guiding of said rotational and relative movements between the dressing wheel and the internally toothed tool during said dressing, said guiding including (a) relative movement between said dressing wheel and said tool along three axes which are orthogonally related to one another, or, (b) relative movement between said dressing wheel and said tool along three axes which are orthogonally related to one another in combination with an additional rotation superposed upon said rotational movement between said tool and dressing wheel, whereby said orthogonal movement or said orthogonal and rotational movements effect a predetermined pitch angle change of the tooth flanks across the width of said tool.

* * * * *